UNITED STATES PATENT OFFICE.

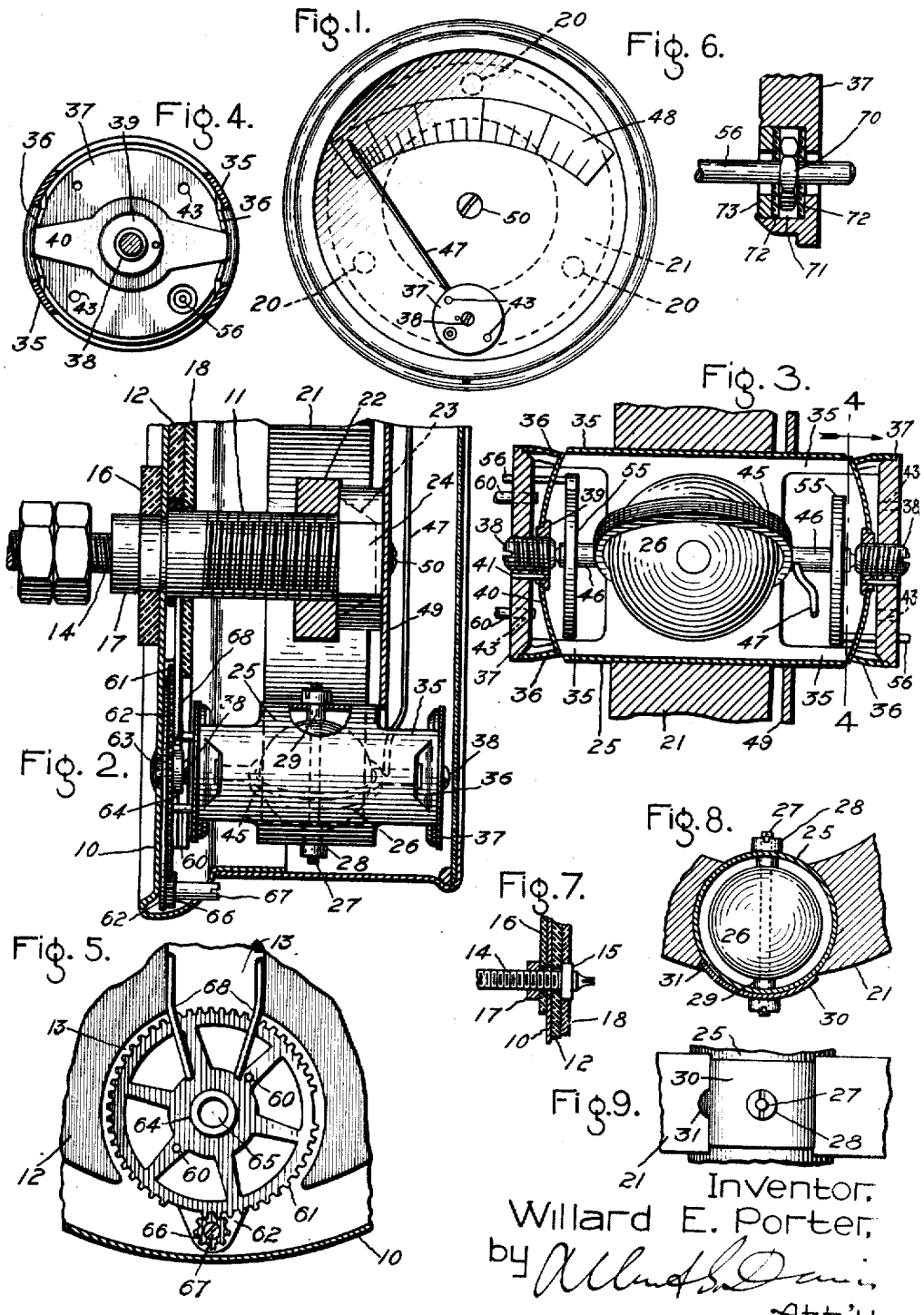

WILLARD E. PORTER, OF LYNN, MASSACHUSETTS, ASSIGNOR TO GENERAL ELECTRIC COMPANY, A CORPORATION OF NEW YORK.

ELECTRICAL MEASURING INSTRUMENT.

1,267,266.　　　　Specification of Letters Patent.　　Patented May 21, 1918.

Application filed May 26, 1916. Serial No. 100,130.

*To all whom it may concern:*

Be it known that I, WILLARD E. PORTER, a citizen of the United States, residing at Lynn, in the county of Essex, State of Massachusetts, have invented certain new and useful Improvements in Electrical Measuring Instruments, of which the following is a specification.

My invention relates to electrical measuring instruments, and particularly to electrical measuring instruments of the D'Arsonval type.

Generally, the invention aims to provide an improved electrical measuring instrument and particularly an improved instrument of simple construction having few parts designed to be assembled in a convenient and inexpensive manner. The principal object of the invention is to provide an inexpensive but at the same time accurate and reliable electric measuring instrument of the D'Arsonval type. A further object of the invention is to provide a simple and inexpensive construction of electrical measuring instrument particularly adapted to be embodied in instruments of relatively small size. Other objects of the invention will be brought out in the course of the following description.

The invention itself and the construction and mode of operation of an electrical instrument embodying the same will be best understood by reference to the accompanying drawings and following description of such an instrument, while the novel features of the invention which I believe to be patentably characteristic thereof are definitely indicated in the appended claims.

In the accompanying drawings, Figure 1 is a top plan view of an electrical measuring instrument embodying the invention; Figs. 2, 3 and 5 are views partly in section showing the principal features of construction of the instrument; Fig. 4 is a sectional view taken along the section line 4—4 of Fig. 3; and Figs. 6, 7, 8 and 9 are views illustrating certain details of the instrument's construction.

The operative elements of the instrument illustrated in the accompanying drawings are secured to a circular back casing member 10 of sheet metal or other suitable material. A screw-threaded supporting post 11 is secured in any suitable manner at the center of the member 10. A circular plate 12 of insulating material, such as sheet fiber, covers the bottom of the member 10. Inasmuch as I prefer to make the plate 12 of fiber I shall hereinafter refer to the same as a fiber plate. A portion of the fiber plate 12 is cut away, as indicated by reference numeral 13, for the accommodation of a zero-shifting device, as will be more fully explained hereinafter. Two binding posts 14 having an integral square nut 15 at their inner ends extend through registering holes in the member 10, fiber plate 12 and an external fiber strip 16. The holes in the fiber members 12 and 16 are of slightly smaller diameter than the corresponding hole in the member 10, and each binding post is firmly secured to the member 10 by a nut 17 (Fig. 7). Each of the binding posts is thus insulated from the member 10. A second circular plate 18, of fiber or other insulating material, having square holes of the same size as the square nuts 15, is positioned on top of the fiber plate 12.

Three supporting studs 20 are secured to the member 10 and extend through suitable holes in the fiber plates 12 and 18. A circular permanent magnet 21 rests upon the studs 20. A yoke 22 is slipped over the supporting post 11 and is provided with upwardly extending ends 23 adapted to rest on diametrically opposite parts of the top surface of the magnet 21. A nut 24 is screw-threaded on the post 11 and is designed to securely clamp the magnet between the studs 20 and the yoke 22. The magnet 21 has no pole pieces, but its ends are given a curved or circular configuration, as best seen in Fig. 8 of the drawings.

A cylindrical shell or tube 25 is securely positioned between the circular ends of the permanent magnet 21. A spherical magnetic core 26 is positioned within the shell 25 and between the ends of the magnet 21. Preferably, the spherical core 26 is a steel ball, such, for example, as is used for ball-bearings. A bolt 27 and coöperating nuts 28 having spacing collars 29 serve to secure and properly position the magnetic core 26 with respect to the shell 25. The shell 25 may be of brass or other suitable non-magnetic material, and is held in its proper position with respect to the magnet 21 by means of a curved plate 30 having an ear 31 extending into an indentation in one of the outer edges of the magnet 21, as will be clearly understood by reference to Figs. 8 and 9 of the drawings.

The shell 25 has cut away portions at each of its ends beyond the corresponding planes of the top and bottom surfaces of the magnet 21, whereby two oppositely positioned projections 35 are provided at each end of the shell. Each of the four projections 35 has an inwardly extending tongue 36. These tongues are preferably formed by slitting the material of the projections to produce the desired configuration of the tongues and then forcing the part constituting the tongue inwardly, as will be clearly understood by reference to Figs. 2, 3 and 4 of the drawings.

A circular cap 37 is mounted on the two projections at each end of the shell 25. A jewel screw 38 is screw-threaded in each cap 37. A nut 39 having a shoulder upon which rests a spring clip 40 is threaded on the inner end of each jewel screw 38 and is held against rotation with respect to the jewel screw by means of a pin 41 fastened in the cap 37 and extending into a hole in the nut 39 (Fig. 3). The cap and jewel screw are securely held on the projections by forcing the ends of the spring clip beneath the tongues. In assembling the instrument, the cap 37, jewel screw 38, nut 39 and spring clip 40 are first secured together, whereupon the ends of the spring clip can be most conveniently forced beneath the tongues 36 by providing two holes 43 in each cap through which two pins on a suitable punch can be inserted to force the ends of the spring clip downwardly, thereby so diminishing the distance between the ends of the clips that the cap and assembled elements can be properly positioned, whereupon the punch is withdrawn and the ends of the spring clip engage beneath the tongues.

The moving element of the instrument comprises a circular current carrying coil 45 wound on a suitable frame of conducting material, such as aluminum, and provided with two pivot shafts 46 whose pivot points are designed to bear in the jewels at the inner ends of the jewel screws 38, as will be clearly understood from an inspection of Fig. 3 of the drawings.

A pointer 47 is secured to the upper pivot shaft 46 and is adapted to sweep across a suitable scale 48. The scale 48 is carried on a circular scale plate 49 secured to the top of the post 11 by a screw 50.

Spiral control springs 55 are secured at their inner ends to the pivot shafts 46 and at their outer ends to studs or pins 56 fastened in the caps 37. The springs 55 also serve to conduct the current to be measured to the movable coil 45 of the instrument in the well understood manner. When the shell 25 is assembled in the instrument two oppositely positioned pins 60 secured to and extending upwardly from a gear 61 project into the holes 43 in the lower cap 37.

The gear 61 rests upon a spacing plate 62 which in turn rests on the member 10. The gear 61 and spacing plate 62 are secured to the member 10 by a bolt 63 and coöperating nut 64. The head of the nut 64 has a recess 65 for the accommodation of the outer end of the lower jewel screw 38, as will be understood by reference to Figs. 2 and 5 of the drawings. The bolt 63 forms a shaft upon which the gear 61 can be rotated. A pinion 66 meshes with the gear 61 and is also mounted on the plate 62 and has an elongated shaft 67 extending through the rim of the member 10. The end of the shaft 67 is slotted for the accommodation of a screw-driver, and it will be observed that the pinion and gear can be conveniently rotated from without the instrument casing by means of the slotted-head shaft 67.

The angle through which the gear 61 can be rotated by the pinion 66 is limited by omitting certain of the teeth of the gear, as shown in Fig. 5, so that the active portion of the gear is in effect sector-shaped. Unmeshing of the gear 61 and pinion 66 is prevented by two spring arms 68 which engage the pins 60 on the gear 61 when the gear is turned to one or the other, as the case may be, of its limiting positions. The spring arms 68 are the ends of a U-shaped wire member positioned about the post 11 and held in position against the side of the cutout portion 13 of the lower fiber plate 12 by the top fiber plate 18. The gear 61 and pinion 66 constitute the zero-shifting device of my present instrument. By turning the shaft 67 in one direction or the other the gear 61 is also turned, and through the engagement of the pins 60 with the holes 43 of the lower cap 37 this cap is moved with respect to its coöperating projections 36. This results in a corresponding movement of the control spring stud 56 and hence an adjustment of the tension of the lower control spring 55. Zero-shifting devices of the type herein illustrated and described are covered in my copending application for Letters Patent of the United States, Serial No. 15,200, filed Mar. 18, 1915.

The manner of securing the control spring studs 56 in the caps 37 so that the studs are insulated from the caps will be understood by reference to Fig. 6 of the drawings. Each stud 56 has a nut 70 integral therewith or secured thereto in any suitable manner. The nut 70 is positioned in a circular chamber 71 in the cap 37. The greatest diameter of the nut 70 is smaller than the diameter of the chamber 71, and the top and bottom surfaces of the nut are covered by washers 72 of the same diameter as the chamber 71. The washers 72 are of insulating material, such for example, as thin sheet mica. A metal washer 73 is positioned on the outer insulating washer 72 and the washers and stud 56 are securely held in position by forcing the material of the cap 37 over the edge of the metal washer 73. It will be observed from Fig. 6 that the registering holes in the metal washer 73 and in the cap 37 through which the stud 56 extends are of larger diameter than the stud. As previously stated the control springs 55 are electrically connected to the terminals of the current carrying coil 45 of the moving element of the instrument, and, accordingly, the control spring studs 56 are adapted to be electrically connected to the square nuts 15 of the binding posts 14, as will be well understood by those skilled in the art.

It will be evident from the foregoing description that the instrument of my present invention is of the well known D'Arsonval type having a movable current carrying coil positioned in an air gap formed between the ends or poles of a permanent magnet and a coöperating magnetic core, and the mode of operation of such an instrument is so well understood that no further description of the operation of the improved instrument of my present invention is deemed necessary. The permanent magnet of my improved instrument has no pole pieces, which results in a material saving in the cost of manufacture of the instrument. The moving element of the instrument and the spherical magnetic core are all carried by the non-magnetic tubular member or shell secured between the pole-faces of the permanent magnet. It will be observed that the spherical magnetic core is supported by the tubular non-magnetic member along an axis substantially in the plane of the permanent magnet and at right angles to the line between the ends of the magnet, while the axis about which the moving element is pivoted is at right angles to both the supporting axis of the spherical core and the line between the ends of the magnet. The various parts are mounted on the tubular non-magnetic supporting member in a manner assuring convenience, accuracy and low cost in assembling. In fact it will be obvious to those skilled in the art that I have provided an instrument of extremely simple construction and one whose cost of manufacture is relatively low.

I have herein shown and described a particular embodiment of my invention for the purpose of explaining its principle and illustrating its applications, but numerous modifications of the details of construction thereof and other embodiments of the invention will present themselves to those skilled in the art. I, therefore, wish to cover by the following claims all modifications within the spirit of the invention.

What I claim as new and desire to secure by Letters Patent of the United States, is:—

1. An electrical measuring instrument comprising a permanent magnet having curved ends with an indentation in one end, a cylindrical shell positioned between the curved ends of said magnet, a magnetic core mounted within said shell and between the ends of said magnet, a member secured to said shell and having an ear registering with said indentation for preventing relative movement of the shell and magnet, and a moving element having a coil positioned within said shell and around said core.

2. An electrical measuring instrument comprising a permanent magnet having curved ends, a cylindrical shell positioned between the curved ends of said magnet with its axis substantially at right angles to the line between the ends of the magnet, a magnetic core mounted within said shell and between the ends of said magnet, means secured to said shell and engaging said magnet for preventing relative movement of the shell and magnet, and a moving element having a coil positioned within said shell and around said core.

3. An electrical measuring instrument comprising a permanent magnet having curved ends, a cylindrical shell positioned between the curved ends of said magnet with its axis substantially at right angles to the line between the ends of the magnet, a magnetic core mounted within said shell and between the ends of said magnet, means for preventing relative displacement of said shell and magnet, and a moving element having a coil positioned within said shell and around said core.

4. An electrical measuring instrument comprising a permanent magnet having curved ends with an indentation in one end, a cylindrical shell of non-magnetic material positioned between the curved ends of said magnet, a spherical magnetic core positioned within said shell and between the ends of said magnet, a plate mounted on said shell and having an ear registering with said indentation for preventing relative movement of the shell and magnet, a bolt adapted to secure the shell and the core and the plate in their respective operative positions, and a moving element having a circular coil positioned within said shell and around said core.

5. An electrical measuring instrument comprising a permanent magnet having curved ends, a cylindrical shell positioned between the curved ends of said magnet with its axis substantially at right angles to the line between the ends of the magnet, a spherical magnetic core mounted within said shell and between the ends of said magnet, and a moving element supported by said shell and having a circular coil positioned within the shell and around said core.

6. An electrical measuring instrument comprising a permanent magnet, a cylindrical shell of non-magnetic material secured between the ends of said magnet with its axis substantially at right angles to the line between the ends of the magnet, a spherical magnetic core positioned between the ends of said magnet, means for supporting said core from said shell, a moving element having a circular coil positioned within the shell and around said core, and means secured to the ends of said shell for pivotally mounting said moving element.

7. An electrical measuring instrument comprising a permanent magnet, a tubular non-magnetic member positioned between the ends of said magnet and having an inner wall of circular section with its axis substantially at right angles to the line between the ends of the magnet, a spherical magnetic core supported by said member along an axis substantially in the plane of the magnet and at right angles to the line between the ends of the magnet, said core being positioned within the member and between the ends of the magnet, and a circular current-carrying coil surrounding said core and pivotally mounted for movement about an axis at right angles to the supporting axis of said core and at right angles to the line between the ends of said magnet.

8. An electrical measuring instrument comprising a permanent magnet, a tubular non-magnetic member positioned between the ends of said magnet with its axis substantially at right angles to the line between the ends of the magnet and having an inner wall of circular section, a bolt extending through said member and positioned substantially in the plane of the magnet and at right angles to the line between the ends of the magnet, a spherical magnetic core mounted on said bolt and uniformly spaced from the inner wall of said member, and a circular current-carrying coil surrounding said core and pivotally supported by said member for movement about an axis at right angles to said bolt and at right angles to the line between the ends of said magnet.

9. An electrical measuring instrument comprising a permanent magnet, a tubular non-magnetic member positioned between the ends of said magnet with its axis substantially at right angles to the line between the ends of the magnet and having an inner wall of circular section, a spherical magnetic core supported by said member and positioned within the member and between the ends of the magnet, and a circular current-carrying coil surrounding said core and pivotally supported by said member.

10. An electrical measuring instrument comprising a permanent magnet, a tubular non-magnetic member positioned between the ends of said magnet with its axis substantially at right angles to the line between the ends of the magnet and having an inner wall of circular section, a bolt extending through said member and positioned substantially in the plane of the magnet and at right angles to the line between the ends of the magnet, a steel ball mounted on said bolt and uniformly spaced from the inner wall of said member, a moving element pivotally supported by said member for movement between the ball and the ends of said magnet about an axis at right angles to said bolt and at right angles to the line between the ends of the magnet, and a circular current-carrying coil mounted on said moving element.

11. An electrical measuring instrument comprising a permanent magnet, a tubular non-magnetic member positioned between the ends of said magnet, two inwardly extending and oppositely positioned tongues near each end of said member, a cap mounted on each end of said member, a resilient element secured to each cap and projecting beneath the two tongues near the corresponding end of the member for securing the cap to the member, a pivot bearing carried by each cap, and a moving element mounted between said pivot bearings.

12. An electrical measuring instrument comprising a permanent magnet, a cylindrical shell of non-magnetic material positioned between the ends of said magnet, a magnetic core carried by said shell and positioned between the ends of said magnet, two inwardly extending and oppositely positioned tongues near each end of said shell, said tongues being integral with the material of the shell, a cap mounted on each end of said shell, a resilient element secured to each cap and projecting beneath the two tongues near the corresponding end of the shell for securing the cap to the shell, a pivot bearing carried by each cap, and a moving element mounted between said pivot bearings.

13. An electrical measuring instrument comprising a permanent magnet, a tubular non-magnetic member positioned between the ends of said magnet, two inwardly extending and oppositely positioned tongues near each end of said member, a cap mounted on each end of said member, a pivot bearing screw-threaded in each cap, a resilient member mounted on each pivot bearing, each pivot bearing having a shoulder coöperating with the cap for securing the resilient element to the cap, the resilient element of each cap projecting beneath the two tongues near the corresponding end of the member for securing the cap to the member, and a moving element mounted between said pivot bearings.

14. An electrical measuring instrument comprising a permanent magnet, a screw-threaded pivot bearing having a shoulder, a resilient element mounted on said shoulder, a cap threaded on said pivot bearing so that the resilient element is held between the cap and shoulder, a tubular non-magnetic member positioned between the ends of said magnet, two inwardly extending and oppositely positioned tongues near one end of said member, said cap being mounted on one end of said member and said resilient element projecting beneath said two tongues for securing the cap to the member, a second pivot bearing, and a moving element mounted between said pivot bearings.

15. An electrical measuring instrument comprising a permanent magnet, a screw-threaded pivot bearing having a shoulder, a resilient element mounted on said shoulder, a cap threaded on said pivot bearing so that the resilient element is held between the cap and said shoulder, a tubular non-magnetic member positioned between the ends of said magnet, two inwardly extending and oppositely positioned tongues near one end of said member, said cap being mounted on one end of said member and said resilient element projecting beneath said two tongues for securing the cap to the member, a second pivot bearing, a moving element mounted between said pivot bearings, a control spring stud secured to said cap and insulated therefrom, and a control spring secured to said stud and to said moving element.

16. An electrical measuring instrument comprising a permanent magnet, a screw-threaded pivot bearing having a shoulder, a resilient element mounted on said shoulder, a cap threaded on said pivot bearing so that the resilient element is held between the cap and said shoulder, a tubular non-magnetic member positioned between the ends of said magnet, two inwardly extending and oppositely positioned tongues near one end of said member, said cap being mounted on one end of said member and said resilient element projecting beneath said two tongues for securing the cap to the member, a second pivot bearing, a moving element mounted between said pivot bearings, a control spring secured to said cap and to said moving element, and a zero shifting means for moving said cap with respect to said member.

17. An electrical measuring instrument comprising a permanent magnet, a tubular non-magnetic member positioned between the ends of said magnet, a cap mounted on each end of said member, a pivot bearing carried by each cap, a moving element mounted between said pivot bearings, a control spring secured to said moving element and to one of said caps, and a zero shifting means for moving said last mentioned cap with respect to said member.

18. An electrical measuring instrument comprising a permanent magnet, a tubular non-magnetic member positioned between the ends of said magnet, a cap mounted on one end of said member, a pivot bearing carried by said cap, a second pivot bearing, a moving element mounted between said pivot bearings, a control spring secured to said moving element and to said cap, and a zero shifting means for moving said cap with respect to said member.

19. An electrical measuring instrument comprising a permanent magnet, a non-magnetic supporting member, a magnetic core supported by said member, a moving element pivotally supported by said member, a control spring stud supported by said member and insulated therefrom, a control spring secured to said moving element and to said stud, and a zero shifting means for moving said stud with respect to said member.

20. An electrical measuring instrument comprising a permanent magnet, a tubular non-magnetic member positioned between the ends of said magnet, two inwardly extending and oppositely positioned tongues near each end of said member, a spring clip having its ends sprung beneath the two tongues near each end of said member, a cap mounted on each end of said member, a pivot bearing threaded in each cap and having a shoulder engaging the spring clip so that the clip is positioned between the cap and the shoulder, and a moving element mounted between said pivot bearings.

21. An electrical measuring instrument comprising a permanent magnet, a tubular non-magnetic member positioned between the ends of said magnet, two inwardly extending and oppositely positioned tongues near each end of said member, a spring clip having its ends sprung beneath the two tongues near each end of said member, a cap mounted on each end of said member, a pivot bearing threaded in each cap and having a shoulder engaging the spring clip so that the clip is positioned between the cap and the shoulder, a moving element mounted between said pivot bearings, a control spring stud secured to each cap and insulated therefrom, and a control spring secured to each stud and to said moving element.

22. An electrical measuring instrument comprising a permanent magnet, a tubular non-magnetic member positioned between the ends of said magnet, two inwardly extending and oppositely positioned tongues near each end of said member, a spring clip having its ends sprung beneath the two tongues near each end of said member, a cap mounted on each end of said member, a pivot bearing threaded in each cap and having a shoulder engaging the spring clip so that the clip is positioned between the cap and the shoulder, a moving element mounted between said pivot bearings, a control spring stud secured to each cap and insulated therefrom, a control spring secured between each stud and said moving element, and a zero shifting means for moving one of said caps with respect to said member.

23. An electrical measuring instrument comprising a permanent magnet having curved ends, a cylindrical shell of non-magnetic material positioned between the curved ends of said magnet, a spherical magnetic core positioned within said shell and between the ends of said magnet, two inwardly extending and oppositely positioned tongues near each end of said shell, said tongues being integral with the material of the shell, a spring clip having its ends sprung beneath the two tongues near each end of said shell, a cap mounted on each end of said shell, a pivot bearing threaded in each cap and having a shoulder engaging the spring clip so that the clip is positioned between the cap and the shoulder, and a moving element mounted between said pivot bearings.

24. An electrical measuring instrument comprising a permanent magnet having curved ends, a cylindrical shell of non-magnetic material positioned between the curved ends of said magnet, a spherical magnetic core positioned within said shell and between the ends of said magnet and supported by the shell, two inwardly extending and oppositely positioned tongues near each end of said shell, said tongues being integral with the material of the shell, a spring clip having its ends sprung beneath the two tongues near each end of said shell, a cap mounted on each end of said shell, a pivot bearing threaded in each cap and having a shoulder engaging the spring clip so that the clip is positioned between the cap and the shoulder, a moving element mounted between said pivot bearings and having a circular current carrying coil arranged within the shell and around said core, a control spring stud secured to each cap and insulated therefrom, a control spring secured to each stud and to said moving element, and a zero shifting means for moving one of said caps with respect to said member.

In witness whereof, I have hereunto set my hand this 23rd day of May, 1916.

WILLARD E. PORTER.